(12) United States Patent
LeBlanc et al.

(10) Patent No.: US 7,624,819 B1
(45) Date of Patent: Dec. 1, 2009

(54) UNIVERSAL JOINT ASSEMBLY

(75) Inventors: Randy LeBlanc, Lafayette, LA (US);
Carl LeBlanc, Lafayette, LA (US)

(73) Assignee: Coiled Tubing Rental Tools, Inc., Broussard, LA (US)

( * ) Notice: Subject to any disclaimer, the term of this patent is extended or adjusted under 35 U.S.C. 154(b) by 0 days.

(21) Appl. No.: 12/184,644

(22) Filed: Aug. 1, 2008

(51) Int. Cl.
*E21B 7/00* (2006.01)
*E21B 4/00* (2006.01)
*F16D 3/00* (2006.01)

(52) U.S. Cl. .................. 175/57; 175/106; 175/107; 175/101; 175/61; 175/403; 464/139; 464/140; 464/155

(58) Field of Classification Search .............. 175/57, 175/101, 106, 107; 464/139, 140, 149, 155
See application file for complete search history.

(56) References Cited

U.S. PATENT DOCUMENTS

| | | |
|---|---|---|
| 3,840,080 A | 10/1974 | Berryman |
| 4,246,976 A | 1/1981 | McDonald, Jr. |
| 4,492,276 A | 1/1985 | Kamp |
| 4,772,246 A | 9/1988 | Wenzel |
| 5,090,497 A | 2/1992 | Beimgraben et al. |
| 5,267,905 A | 12/1993 | Wenzel et al. |
| 5,495,900 A | 3/1996 | Falgout, Sr. |
| 5,588,818 A | 12/1996 | Houmand et al. |
| 5,704,838 A | 1/1998 | Teale |
| 6,183,226 B1 | 2/2001 | Wood et al. |
| 6,203,435 B1 * | 3/2001 | Falgout, Sr. .............. 464/18 |
| 6,905,319 B2 | 6/2005 | Guo |
| 6,949,025 B1 | 9/2005 | Kraus et al. |
| 7,004,843 B1 | 2/2006 | Kerstetter |
| 7,186,182 B2 | 3/2007 | Wenzel et al. |
| 2008/0029304 A1 | 2/2008 | LeBlanc et al. |

FOREIGN PATENT DOCUMENTS

CA 2058080 6/1992

OTHER PUBLICATIONS

U.S. Appl. No. 11/500,012, filed Aug. 7, 2006, LeBlanc et al.
U.S. Appl. No. 12/196,954, filed Aug. 22, 2008, LeBlanc.

* cited by examiner

*Primary Examiner*—Jennifer H Gay
*Assistant Examiner*—Yong-Suk Ro
(74) *Attorney, Agent, or Firm*—Fish & Richardson P.C.

(57) ABSTRACT

A universal joint assembly includes an assembly housing, an assembly cap coupled to the assembly housing, a rotatable mandrel, a plurality of substantially spherical drive balls, and a floating washer. The assembly housing has a plurality of pockets formed in an interior surface of the assembly housing. The rotatable mandrel is fitted within a cavity defined by the assembly housing and the assembly cap and has a plurality of pockets configured to partially receive the drive balls. The substantially spherical drive balls are rotatable within the cavity about a central axis of the mandrel. A substantially circular groove formed in the cavity is defined by a proximal end of the assembly cap and an interior wall and a shoulder of the assembly housing. The floating washer is disposed within the substantially circular groove and configured to radially displace within the groove.

22 Claims, 8 Drawing Sheets

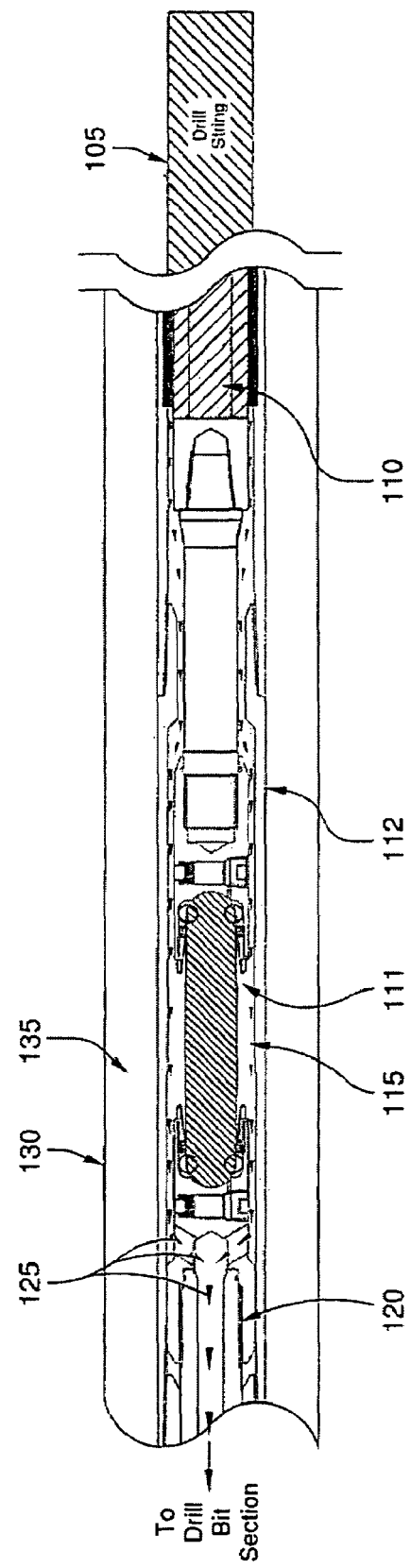

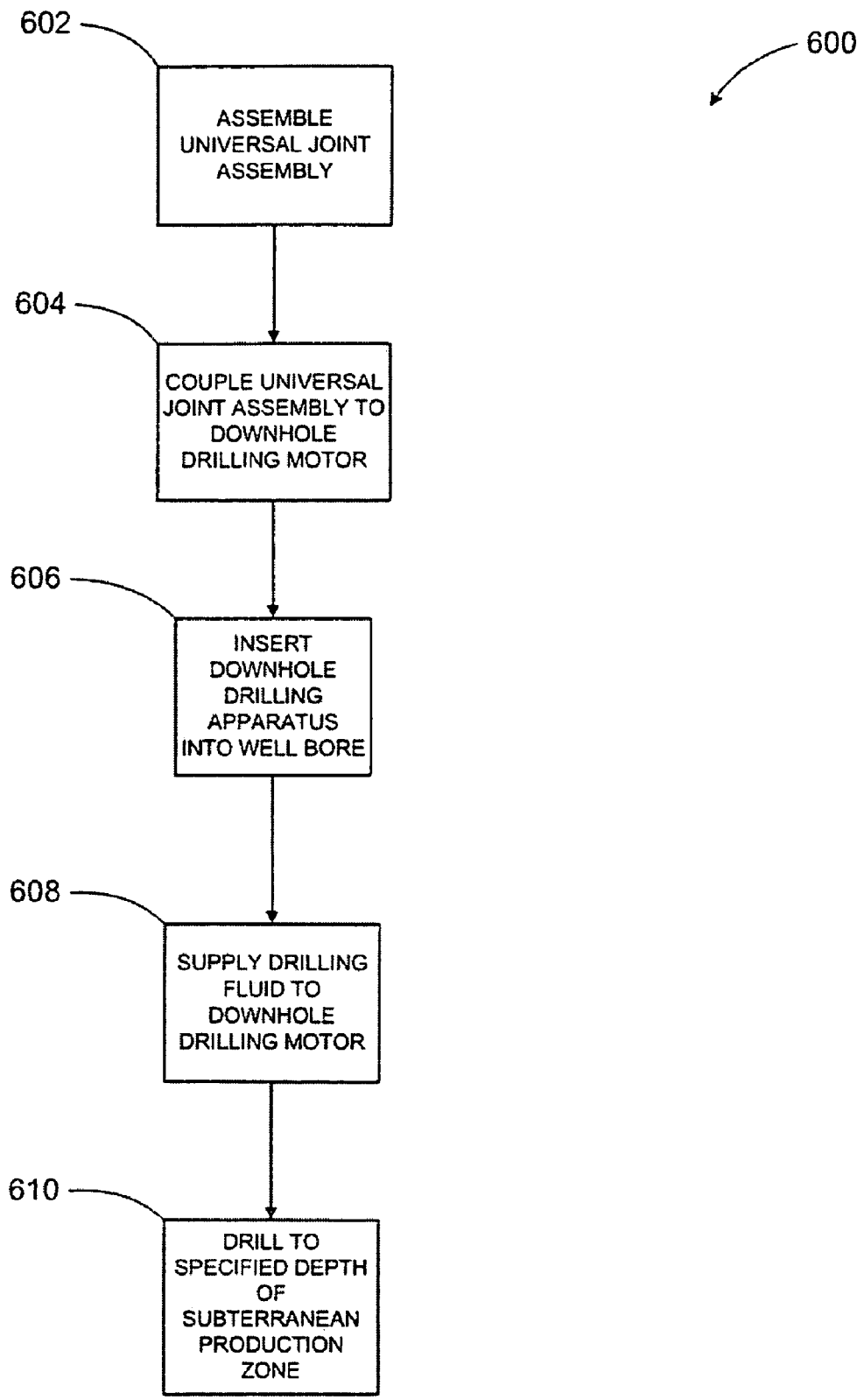

UNIVERSAL JOINT ASSEMBLY

TECHNICAL BACKGROUND

This disclosure relates to well bore equipment and, more particularly, to downhole tools used for drilling well bores.

BACKGROUND

Downhole drilling motors have been used for many years in the drilling of oil and gas wells and other wells. In a usual mode of operation, the rotational power output shaft of the motor and the drill bit will rotate with respect to the housing of the motor. The housing, in turn, is connected to a conventional drill string composed of drill collars and sections of drill pipe. This drill string extends to the surface. Drilling fluid is pumped down through the drill string to the bottom of the hole and back up the annulus between the drill string and the wall of the bore hole. The drilling fluid cools the drill bit and removes the cuttings resulting from the drilling operation. In the instances where the downhole drilling motor is a hydraulic powered type, such as a turbine or positive displacement type motor, the drilling fluid also supplies the hydraulic power to operate the motor.

Many downhole drilling motors have typically been powered by an elongated, helically shaped rotor housed within a helically-shaped stator. These motors are commonly known in the art as moineau-style motors. The rotors and stators create eccentric rotation that must be transferred to concentric rotation. This eccentric motion is typically transferred by means of a joint or misaligned rotating shafts which transfer power across a bearing section to rotate a drill bit. Typical assemblies may utilize a flexible boot surrounding the male and female joint. In some instances, premature failure of the boot may cause loss of the lubricating medium and possibly, premature failure of the joint itself.

SUMMARY

This disclosure relates to well bore equipment and, more particularly, to downhole tools used for drilling well bores.

In one general implementation, a universal joint assembly includes an assembly housing, an assembly cap coupled to the assembly housing, a rotatable mandrel, a plurality of substantially spherical drive balls, and a floating washer. The assembly housing has a plurality of pockets formed in an interior surface of the assembly housing, where the pockets are configured to partially receive the plurality of drive balls. The rotatable mandrel is fitted within a cavity defined by the assembly housing and the assembly cap and has a plurality of pockets configured to partially receive the drive balls. The plurality of substantially spherical drive balls are rotatable within the cavity about a central axis of the mandrel. The universal joint assembly also includes a substantially circular groove formed in the cavity, where the groove is defined by a proximal end of the assembly cap and an interior wall and a shoulder of the assembly housing. The floating washer is disposed within the substantially circular groove and configured to radially displace within the groove when the central axis of the mandrel is displaced from a central axis of the assembly housing.

In more specific aspects, the universal joint assembly also may include a ring seal disposed in a ring seal groove formed in the floating washer. The ring seal may be disposed between the floating washer and the mandrel and in contact with the mandrel and the washer during rotation of the mandrel within the cavity. Further, the universal joint assembly may include a reservoir formed in the assembly housing and configured to store a lubricating fluid and a lubricant piston. The reservoir may be in fluid communication with the cavity. The lubricant piston may include an interior surface, where a first pressure is applied to the interior surface, and an exterior surface. A second pressure may be applied to the exterior surface. The lubricant piston may drive the lubricating fluid from the reservoir to the cavity when the second pressure is greater than the first pressure. In certain aspects, the second pressure may be substantially equal to a pressure of a drilling fluid between the assembly housing and a drill string. Additionally, the reservoir may enclose a predetermined amount of lubricating fluid calculated based on a length of drilled well bore.

In certain aspects, the assembly housing includes a threaded connection. Further, the universal joint assembly may include a cap seal disposed in a cap seal groove formed in the floating washer, where the cap seal may be disposed between the washer and the assembly cap and in contact with the assembly cap and the washer during rotation of the mandrel within the cavity. The universal joint assembly may also include an o-ring seal disposed between the assembly cap and the assembly housing. The floating washer may radially displace within the groove when the central axis of the mandrel is displaced from the central axis of the assembly housing by between approximately 0 degrees and approximately 4 degrees.

In another general implementation, a downhole drilling apparatus includes a downhole drilling motor and a universal joint assembly coupled to the downhole drilling motor. The universal joint assembly includes an assembly housing, an assembly cap coupled to the assembly housing, a rotatable mandrel, a plurality of substantially spherical drive balls, and a floating washer. The assembly housing has a plurality of pockets formed in an interior surface of the assembly housing, where the pockets are configured to partially receive the plurality of drive balls. The rotatable mandrel is fitted within a cavity defined by the assembly housing and the assembly cap and has a plurality of pockets configured to partially receive the drive balls. The plurality of substantially spherical drive balls are rotatable within the cavity about a central axis of the mandrel. The universal joint assembly also includes a substantially circular groove formed in the cavity, where the groove is defined by a proximal end of the assembly cap and an interior wall and a shoulder of the assembly housing. The floating washer is disposed within the substantially circular groove and configured to radially displace within the groove when the central axis of the mandrel is displaced from a central axis of the assembly housing.

In certain embodiments, the downhole drilling apparatus may include a ring seal disposed in a ring seal groove formed in the floating washer, where the ring seal disposed between the floating washer and the mandrel and in contact with the mandrel and the washer during rotation of the mandrel within the cavity. The universal joint assembly may further include a reservoir formed in the assembly housing and configured to store a lubricating fluid and a lubricant piston. The reservoir may be in fluid communication with the cavity. The lubricant piston may include an interior surface, where a first pressure is applied to the interior surface, and an exterior surface. A second pressure may be applied to the exterior surface. The lubricant piston may drive the lubricating fluid from the reservoir to the cavity when the second pressure is greater than the first pressure. In certain aspects, the second pressure may be substantially equal to a pressure of a drilling fluid flowing through the downhole drilling motor.

In some aspects, the universal joint assembly of the downhole drilling apparatus may further include a cap seal disposed in a cap seal groove formed in the floating washer, where the cap seal may be disposed between the washer and the assembly cap and in contact with the assembly cap and the washer during rotation of the mandrel within the cavity. The downhole drilling apparatus may also include an o-ring seal disposed between the assembly cap and the assembly housing. The floating washer may radially displace within the groove when the central axis of the mandrel is displaced from the central axis of the assembly housing by between approximately 0 degrees and approximately 4 degrees.

In certain specific aspects of the downhole drilling apparatus, the assembly housing may coupled to the downhole drilling motor via a threaded connection. Additionally, the downhole drilling motor may be a moineau-style drilling motor.

In another general implementation, a method of using a downhole drilling apparatus includes providing a downhole drilling motor; providing a universal joint assembly; coupling the universal joint assembly to the downhole drilling motor; inserting at least a portion of the downhole drilling apparatus into a well bore; and supplying power to the downhole drilling motor. The universal joint assembly includes an assembly housing, an assembly cap coupled to the assembly housing, a rotatable mandrel, a plurality of substantially spherical drive balls, and a floating washer. The assembly housing has a plurality of pockets formed in an interior surface of the assembly housing, where the pockets are configured to partially receive the plurality of drive balls. The rotatable mandrel is fitted within a cavity defined by the assembly housing and the assembly cap and has a plurality of pockets configured to partially receive the drive balls. The plurality of substantially spherical drive balls are rotatable within the cavity about a central axis of the mandrel. The universal joint assembly also includes a substantially circular groove formed in the cavity, where the groove is defined by a proximal end of the assembly cap and an interior wall and a shoulder of the assembly housing. The floating washer is disposed within the substantially circular groove and configured to radially displace within the groove when the central axis of the mandrel is displaced from a central axis of the assembly housing.

In more specific aspects, supplying power to the downhole drilling motor includes supplying a drilling fluid at a specified flow rate to the downhole drilling motor. The method may also include, prior to coupling the universal joint assembly to the downhole drilling motor, the steps of: sliding the assembly cap over the mandrel; sliding the washer over the mandrel; seating the plurality of substantially spherical drive balls on the mandrel; and coupling the assembly housing to the assembly cap over the mandrel. Further, seating the plurality of substantially spherical drive balls on the mandrel may include machining the plurality of pockets on the mandrel, where the plurality of pockets equal to the plurality of substantially spherical drive balls; and seating the plurality of substantially spherical drive in the plurality of pockets machined on the mandrel.

Various implementations of a universal joint assembly according to the present disclosure may include one or more of the following features. For example, the universal joint assembly may more completely maintain a seal between a lubricating fluid within the assembly and a drilling fluid during drilling operations. As another example, the universal joint assembly may be more easily manufactured and assembled, thereby increasing efficiencies and decreasing costs. As a further example, the universal joint assembly may help simplify field installations in a drilling operation. As yet another example, the universal joint assembly may be coupled within a drill string or a downhole drilling motor with a variety of connection methods. As another example, the universal joint assembly may be used with a constant speed rotation or variable speed rotation downhole drilling motor. As a further example, the universal joint assembly may allow for at least a 4 degree bend of the universal joint assembly without damage or breakage.

Various implementations of a universal joint assembly according to the present disclosure may also include one or more of the following features. For instance, the universal joint assembly may allow for internal lubrication without an external boot. As another example, the universal joint assembly may provide for constant or substantially constant internal lubrication of the assembly during drilling operations in proportion to a downhole pressure of the drilling fluid. As a further example, the universal joint assembly may provide for a constant pressure lubrication method of one or more components of the assembly during drilling operations. As yet a further example, the universal joint assembly may include a pre-measured amount of lubricant calculated according to an amount of drilling time of a drilling operation.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIG. 1 illustrates a downhole drilling apparatus that incorporates one particular implementation of a universal joint assembly in accordance with the present disclosure;

FIG. 6 illustrates one method of using a universal joint assembly in accordance with the present disclosure.

Like reference symbols in the various drawings indicate like elements.

DETAILED DESCRIPTION

Figure 2A:
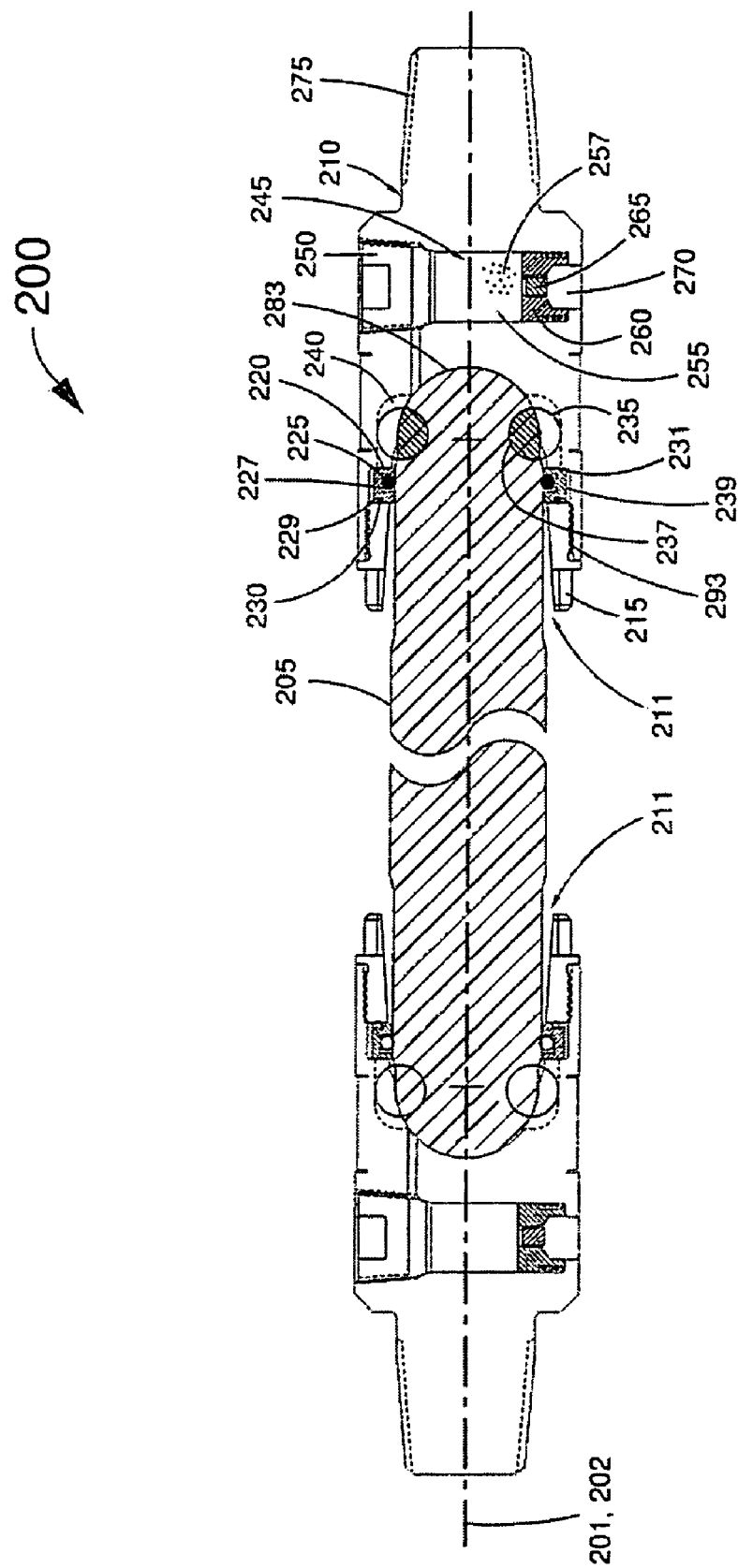
FIGS. 2A-C illustrate one implementation of a universal joint assembly at various positions in accordance with the present disclosure.

A universal joint assembly may be utilized in a downhole drilling apparatus to connect particular sections of the apparatus, such as a power section of a downhole drilling motor, a bearing section, a drill bit section, or other sections of the apparatus as appropriate. Further, the universal joint assembly may convert an eccentric rotation output of the power section of the downhole drilling motor to concentric rotation and transmit such concentric rotation to the drill bit section. Because of, for instance, heat both naturally occurring in a well bore and generated by friction in the drilling apparatus in the well bore, devices within the well bore with rotating components may need lubrication in order to avoid failure. The universal joint may include a mandrel that rotates within a cavity formed by an assembly housing and assembly cap enclosing a portion of the mandrel and transmits axial force and torque to the assembly housing. The universal joint assembly also includes a lubricating system containing a lubricating fluid. At least a portion of the lubricating fluid is contained in the cavity and lubricates the moving components during rotation, such as the mandrel, the assembly housing, and multiple balls situated within the cavity that transmit torque from the mandrel to the assembly housing while permitting omni-directional movement of the mandrel.

The universal joint assembly also includes a floating washer fitted around the mandrel and designed to float radially within a groove in the cavity thereby providing a substantially fluid-tight seal between the lubricating fluid in the cavity and drilling fluid between the universal joint assembly and a downhole tool housing at a drilling angle position of the universal joint assembly up to at least 4 degrees from a longitudinal axis of the drilling motor. The lubricating fluid contained in the cavity and a drilling fluid flowing past and around the universal joint assembly may be kept substantially separate. The lubricating fluid contained in the cavity may typically be consumed due to the heat and friction occurring during rotational movement of the mandrel. In order to provide substantially constant lubrication, the universal joint assembly may include a pressure-balanced force-feed lubricating device within the assembly housing. The lubricating device allows for substantially constant lubrication of the universal joint assembly to occur in proportion to the pressure of the drilling fluid surrounding the universal joint assembly.

FIG. 1 illustrates a downhole drilling apparatus 100 that incorporates one particular implementation of a universal joint assembly in accordance with the present disclosure. Downhole drilling apparatus 100, typically, is used to form a well bore 130 through one or more subterranean formations, such as shale, sandstone, coal, or other geologic zones occurring at sub-surface depths. Such zones may be desirable to access from the surface due to deposits of petroleum natural resources (e.g., oil, natural gas) contained therein. In some aspects, the downhole drilling apparatus 100 may be used as a directional drilling apparatus to form directional (e.g., horizontal, slant) well bores. The downhole drilling apparatus 100 includes a downhole drilling motor power section 110, a universal joint assembly 115, and a drill bit section 120. In typical embodiments of the downhole drilling apparatus 100, the aforementioned apparatus sections and any other appropriate sections are connected to a drill pipe, or "string," 105. The drill string 105 generally consists of multiple sections of threaded pipe and/or threaded drill collars coupled to each other and extending to the surface.

In order to advance the downhole drilling apparatus 100 further into the sub-surface zones to form the well bore 130 to a specified depth, drilling fluid 125 is typically pumped in a central bore 111 from the surface through the drill string 105 and into the power section 112. The drilling fluid 125 may be different substances depending on, for instance, the application of the downhole drilling apparatus 100, the subterranean zones being penetrated by the downhole drilling apparatus 100, and the pressure of such zones relative to the pressure of the drilling fluid 125. For example, the drilling fluid 125 may be air, a mixture of air and water, water, drilling "mud," such as water or other fluid mixed with a polymer or clay substance, or a form of synthetic fluid, to name but a few. Drilling fluid 125 is used for several purposes, namely, to provide hydraulic power to the power section 110 (as described below), cool and lubricate the drill bit section 120 as it cuts through the geologic formation being drilled, and remove the drilled formation cuttings to the surface. For instance, once the drilling fluid exits the drill bit section 120 and picks up the formation cuttings (e.g., bits of rock), the drilling fluid 125 travels back to the surface via an annulus 135 between the drill string 105 and the well bore 130.

The downhole motor power section 110, generally, supplies rotational power that is transferred to the drill bit section 120 through the universal joint assembly 115, such rotation allowing the drill bit section 120 to create the well bore 130. The rotational power supplied by the power section 110 may be generated by the drilling fluid 125, which is pumped at a specified flow rate through the drilling string 105 and into the power section 110. The power section 110 includes a rotor that is turned by the flowing drilling fluid 125 at a speed proportional to the volume of the drilling fluid 125 passing through the power section 110. In some embodiments, the power section 110 may be a moineau-style downhole motor power section or alternatively, a turbine-style downhole motor.

The universal joint assembly 115 is coupled between the power section 110 and the drill bit section 120. The universal joint assembly 115 converts eccentric rotation from the power section 110 to concentric rotation to supply to the drill bit section 120. Generally, the universal joint assembly 115 is coupled to the power section 110 and the drill bit section 120 via a threaded connection. Alternatively, the universal joint assembly 115 may be coupled to such sections via other specialty connections. Although the drilling fluid 125 may flow around the universal joint assembly 115 in the central bore 111 toward the drill bit section 120, in some aspects (as described below), the drilling fluid 125 may be substantially sealed from one or more components of the universal joint assembly 115 to, for example, better decrease the possibility of failure of the universal joint assembly 115 during drilling operations.

Figure 2B:
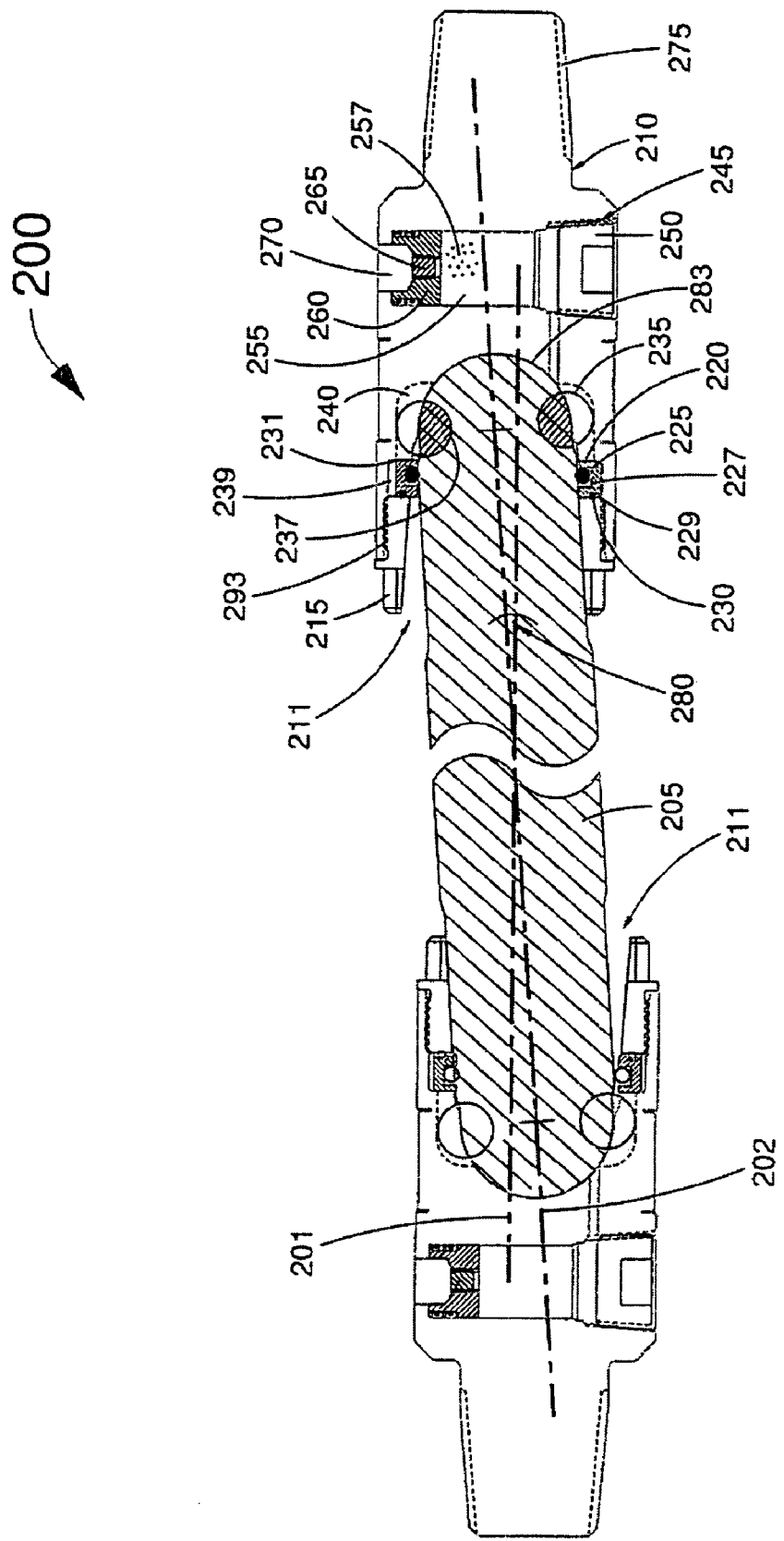
Figure 2C:
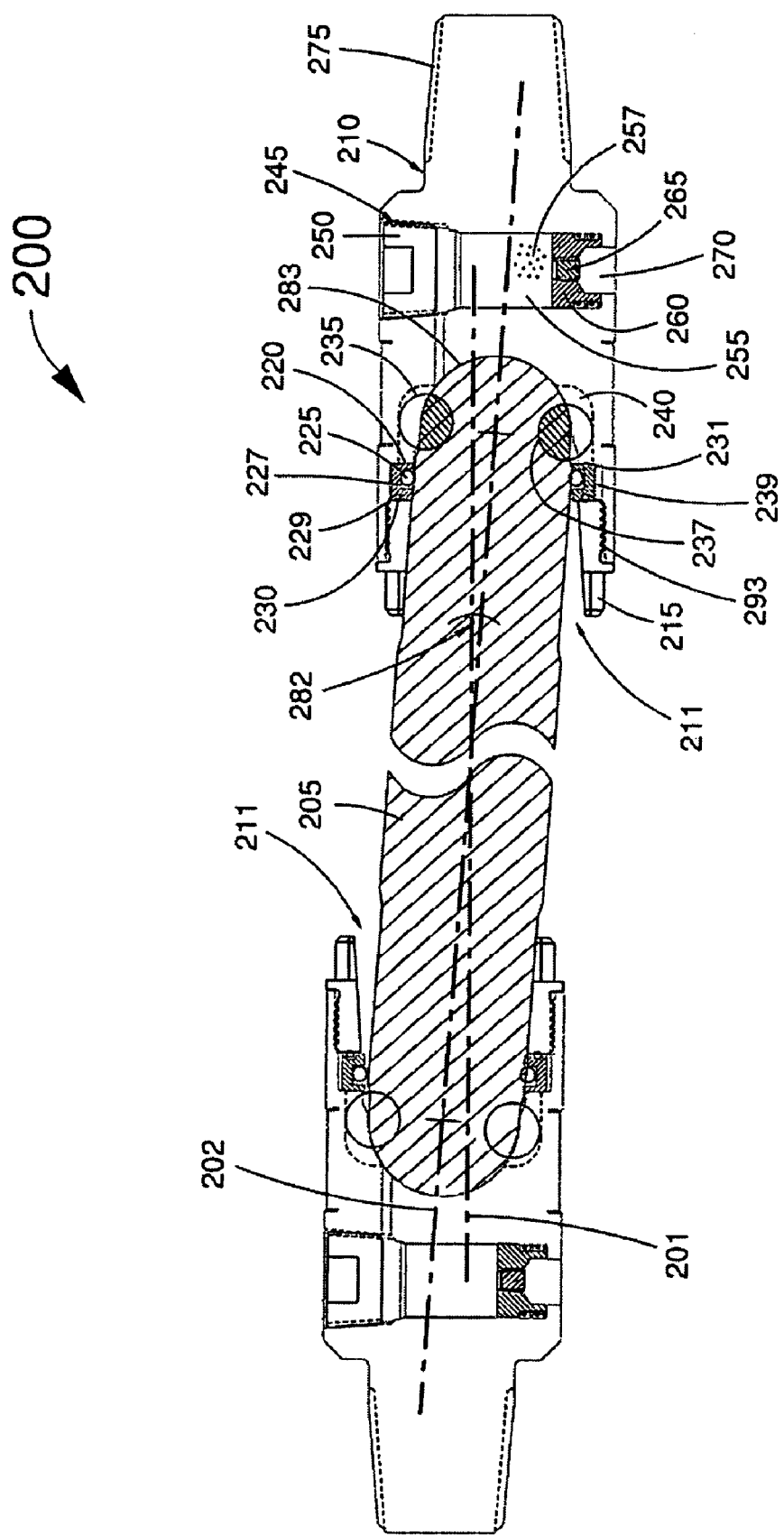

FIGS. 2A-C illustrate one implementation of a universal joint assembly 200 at various positions in accordance with the present disclosure. Universal joint assembly 200, in some embodiments, may be substantially similar and used in similar drilling operations and with similar downhole drilling equipment as universal joint assembly 115 described in FIG. 1. Turning particularly to FIG. 2A, the universal joint assembly 200 is shown at a substantially straight, or 0 degree drilling angle. More specifically, FIG. 2A shows the universal joint assembly 200 with a longitudinal axis 202 of a mandrel 205 substantially parallel to a longitudinal axis 201 of an assembly housing 210. The universal joint assembly 200, generally, provides for a coupling mechanism between at least a portion of a downhole drilling motor and, for example, a drill bit section of a downhole drilling apparatus. Further, the universal joint assembly 200 may transform eccentric rotation of a drilling apparatus generated by a power section of the downhole drilling motor into concentric rotation. The universal joint assembly 200 may also transfer this concentric rotation to the drill bit section.

Universal joint assembly 200 includes a mandrel 205, an assembly housing 210, an assembly cap 215, a floating washer 220, a ring seal 225, a cap seal 230, and multiple drive balls 235. As illustrated in FIG. 2A, the universal joint assembly 200 may include substantially mirrored ends, i.e., each end of the universal joint assembly 200 includes the same components. In such fashion, the universal joint assembly 200 may be reversible such that either end of the universal joint assembly 200 may couple to a downhole drilling motor and a drill bit section. Alternatively, the universal joint assembly 200 may include non-mirrored, or specialized ends, such that each end of the universal joint assembly 200 is specifically configured to couple to a particular downhole drilling device (e.g., a power section of a downhole drilling motor, a bearing section, or a drill bit section).

The mandrel 205 is a substantially cylindrical member with radiused end portions. However, the mandrel 205 (as well as other components of the universal joint assembly 200) may be any particular shape depending on the design of the universal joint assembly 200. In some implementations, the mandrel 205 may be formed from carbon steel, alloy steel, stainless steel, or other alternative metals. Generally, however, the mandrel 205 must be able to withstand significant heat and friction that may occur in the downhole drilling operation. At each end of the mandrel 205, semi-spherical pockets 237 may be machined around the circumference of the mandrel 205 to serve as seats for the drive balls 235. During rotation of the mandrel 205 (e.g., when rotation is generated by a drilling motor power section), the drive balls 235 remain substantially seated in the pockets 237 and rotate with the mandrel 205.

The assembly cap 215 (sometimes referred to by those of ordinary skill in the art as a "CV cap") is substantially circular and fits over the mandrel 205. At least a portion of the assembly cap 215 is threaded (e.g., male NPT or straight threaded connection) to allow for connection to the assembly housing 210. The assembly housing 210 fits over the mandrel 205 and a distal, reduced-thickness portion of the assembly housing 210 includes a threaded connection 293 (e.g., female NPT or straight threaded connection) to connect to the assembly cap 215. Other forms of mechanical fastening, however, may be utilized to couple the assembly housing 210 and the assembly cap 215. When the assembly housing 210 is securely fastened to the assembly cap 215, a cavity 240 is formed in which the mandrel 205, the drive balls 235, and the sealing components reside. Typically, the cavity 240 encloses a lubricating medium 257, which provides substantially constant lubrication between the moving parts of the universal joint assembly 200, namely the mandrel 205, drive balls 235, pockets 237, and assembly housing 210, during a drilling operation. In some implementations, the mandrel 205, the assembly housing 210, and the assembly cap 215 may be a constant velocity ("CV") mandrel, a CV housing, and a CV cap, respectively.

Assembly housing 210 includes an interior wall and shoulder 231 in the proximal end. Upon connection of the assembly housing 210 and the assembly cap 215, a groove 239 is formed by a proximal end of the assembly cap 215 and the interior wall and shoulder 231 of the assembly housing 210, within which the floating washer 220 fits. The floating washer 220, generally, is a substantially circular ring that fits around the mandrel 205 and provides for a sealing mechanism to substantially prevent escape of the lubricating fluid 257 contained in the cavity 240 to the exterior 211 of the universal joint assembly 200 and further, substantially prevent entrance of a drilling fluid from the exterior 211 of the universal joint assembly 200 (e.g., the to the cavity 240. Drilling fluids, such as water or mud for example, may cause substantial corrosion or loss of viscosity of the lubricating fluid 257, thereby possibly causing premature failure of the universal joint assembly 200. The floating washer 220, in some aspects, may be formed from stainless steel or a hardened rubber or neoprene material.

With particular reference to FIG. 2A, the floating washer 220 is shown at a midpoint location within the groove 239. At this midpoint location, which may occur when the universal joint assembly 200 is at a substantially 0 degree drilling angle, the floating washer 220 is situated in the groove 239 such that the floating washer 220 is slightly offset from the sidewall of the assembly housing 210. During rotation of the mandrel 205, and thus the assembly housing 210, the floating washer 220 remains substantially set at this location. Turning now to FIG. 2B, the universal joint assembly 200 is shown at an angled position. For example, FIG. 2B may show the universal joint assembly 200 at an angle 280 which is substantially equal to about 4 degrees from the longitudinal axis 201 of the assembly housing 210. In other words, the angle 280 between the longitudinal axis 202 of the mandrel 205 and the longitudinal axis 201 of the assembly housing 210 (and longitudinal axis of a drilling motor) is approximately 4 degrees. Such an offset position may be used, for example, with a fixed bend or adjustable housing drilling in a directional drilling operation. At this position, the floating washer 220 may be shifted (i.e., "float") radially away from the longitudinal axis 201 of the assembly housing 210 due to the position of the mandrel 205. The floating washer 220 in the groove 239 may thus rest up against the assembly housing 210 along a portion of its circumference while offset from the assembly housing 210 along the rest of its circumference.

Turning now to FIG. 2C, another angularly offset position of the universal joint assembly 200 is illustrated. Like the position of the universal joint assembly 200 shown in FIG. 2B, the angle 282 may be approximately 4 degrees also, but in a negative direction from the longitudinal axis 201. In such a position as shown in FIG. 2C, the floating washer 220 may be shifted radially in the opposite direction as that shown in FIG. 2B to reside against the assembly housing 210. In short, regardless of the angular position of the mandrel 205 within the universal joint assembly 200, the floating washer 220 radially floats within the groove 239 of the cavity 240 in which it sits to provide a seal between the cavity 240 and the exterior 211 of the universal joint assembly 200.

In some aspects, a ring seal 225 fits within a ring seal groove 227 disposed in the inside circumferential face of the floating washer 220 and up against the exterior cylindrical surface of the mandrel 205. The ring seal 225 may be substantially circular and formed of rubber, neoprene, or other pliable material. Along with the floating washer 220, the ring seal 225 helps ensure a fluid-tight seal between the cavity 240 and the exterior 211 of the universal joint assembly 200. Similarly, the universal joint assembly 200 may include a cap seal 230, which fits within a cap seal groove 229 formed in a longitudinal face of the floating washer 220 and up against the proximal end of the assembly cap 215. The cap seal 230 may also be substantially circular and made of rubber, neoprene, or other pliable material. Like the ring seal 225, the cap seal 230 may also help ensure a fluid-tight seal between the cavity 240 and the exterior 211 of the universal joint assembly 200 regardless of the angular position of the mandrel 205. Typically, the ring seal 225 and the cap seal 230 radially shift in concert with the floating washer 220.

Continuing with FIG. 2A, the drive balls 235 are seated around the end of the mandrel 205 within the pockets 237 machined into the surface of the mandrel 205. Generally, the drive balls 235 permit omni-directional movement of the mandrel 205 within the cavity 240 while transmitting radial torque loads from the mandrel 205 to the assembly housing 210. In general operation, substantially all of the downward axial load of the drill string may be directly transmitted to or from the semi-spherical convex end of the mandrel 205 as it contacts the semi-spherical concave portion 283 of the assembly housing 210. For example, a large mandrel 205 radius at the end of the mandrel 205 may result in a larger and stronger cross-sectional area of the mandrel 205 in communication with the assembly housing 210, which may allow for greater torque and thrust to be transmitted by the mandrel 205 to the drill bit section and for reduced rotational thrust wear.

The assembly housing 210, as noted above, is coupled to the assembly cap 215, thereby defining at least a portion of the cavity 240. A distal end of the assembly housing 210 may include a housing connector 275, which allows the universal joint assembly 200 to be coupled to another section of the downhole drilling apparatus, such as, for example, the power section of the downhole drilling motor, a bearing section, or a drill bit section. In some aspects, as shown in FIG. 2A, the housing connector 275 is a threaded connection. Alternatively, the housing connector 275 may be a specialty connection.

The assembly housing 210 may also include a lubricating module 245. The lubricating module 245 may be integral with the assembly housing 210 or, alternatively, other components of the universal joint assembly 200. Generally, as described in more detail with reference to FIGS. 3A-B, the lubricating module 245 allows for a specified amount of lubricating fluid 257 to be stored within the assembly housing 210 and constantly force-fed to the cavity 240 by an annulus pressure of a drilling fluid on the piston 260, thereby ensuring constant lubrication of the moving components within the cavity 240 (e.g., the mandrel 205, the drive balls 235, the pockets 237, and the assembly housing 210).

The lubricating module 245 includes a setscrew cap 250, a reservoir 255, a piston 260, and a bleed setscrew 265. The reservoir 255 is, typically, a substantially cylindrical void formed in the assembly housing 210, which may enclose a lubricating fluid 257. The lubricating fluid 257 is enclosed within the reservoir 255 at one end by the setscrew cap 250, which is detachably secured to the assembly housing 210 by, for example, a threaded connection. The lubricating fluid 257 is also enclosed within the reservoir 255 at the other end by the piston 260. The bleed setscrew 265 is, typically, inserted into a threaded aperture formed in the piston 260 and allows for excess air or gas in the reservoir 255 to be removed when filling the reservoir 255 with the lubricating fluid 257.

The piston 260 is substantially cylindrical to fit snugly within the reservoir 255 and displaces throughout the length of the reservoir 255 relative to a pressure in the reservoir 255 compared to a pressure exerted by the drilling fluid at the exterior 211 of the universal joint assembly 200. For example, the piston 260 may include an exterior surface exposed to a housing opening 270 of the assembly housing 210. The housing opening 270 may be exposed to an exterior 211 of the universal joint assembly 200 and thus, a drilling fluid flowing past and around the universal joint assembly 200 during drilling operations. The piston 260 may also include an interior surface in contact with the lubricating fluid 257. Because the piston 260 may displace throughout the reservoir 255, when a pressure at the housing opening 270 is greater than the pressure in the reservoir 255, the piston 260 may move inward to force-feed lubricating fluid 257 from the reservoir 255 to the cavity 240.

Figure 3A:
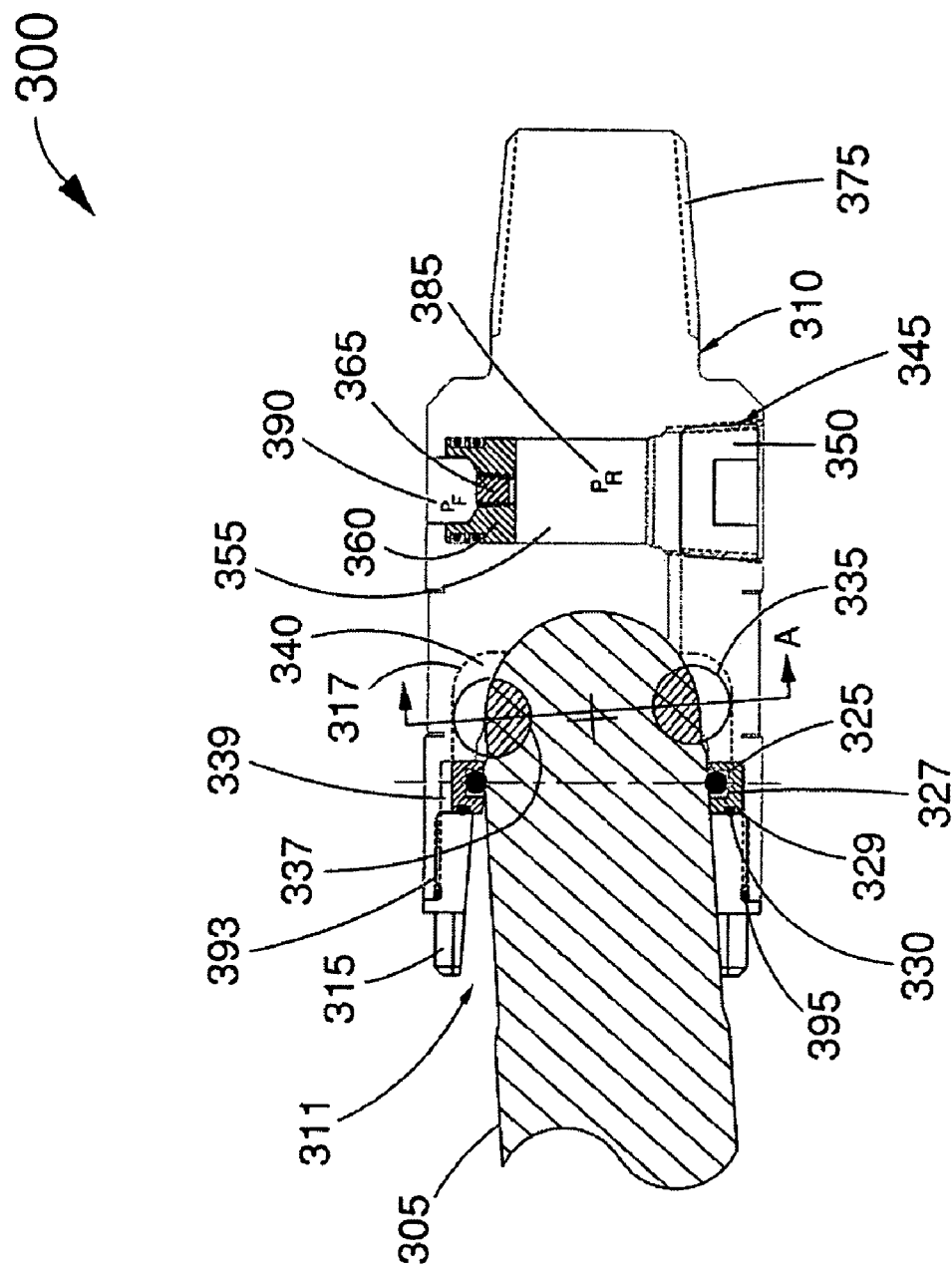
FIGS. 3A-B illustrate one portion of a universal joint assembly in accordance with the present disclosure.
Figure 3B:
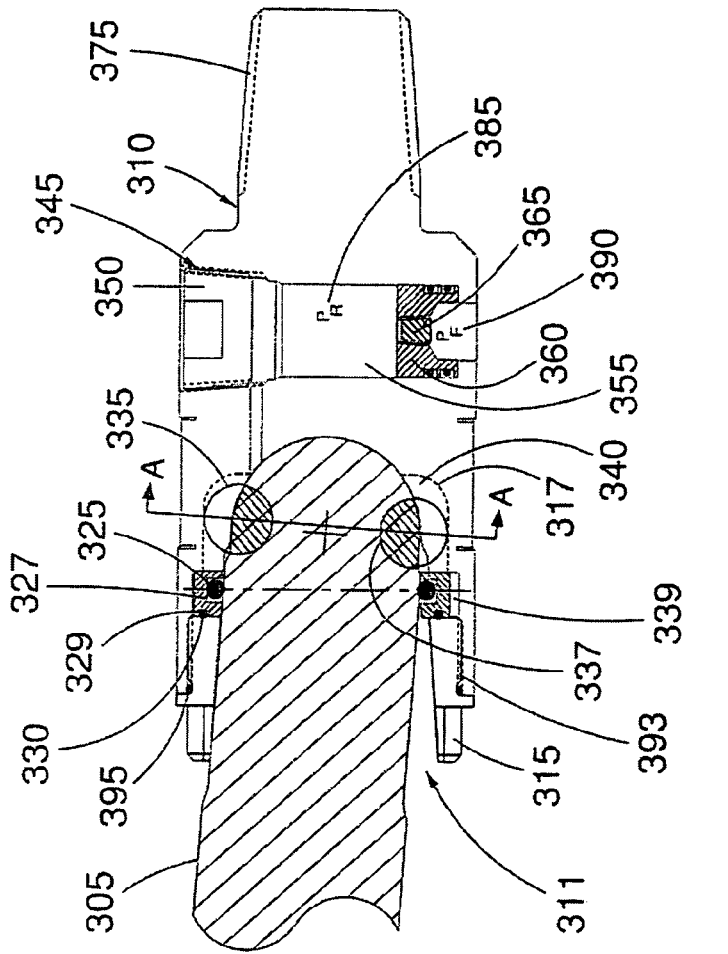

FIGS. 3A-B illustrate one portion of a universal joint assembly 300 in accordance with the present disclosure. In some implementations, universal joint assembly 300 and its components may be substantially similar to the universal joint assembly 200 described above and its corresponding components. More specifically, FIGS. 3A-B illustrate a magnified view of one end of the universal joint assembly 300 at two distinct bent angle positions. The bent angle positions may be, for example, approximately a 4 degree bent angle position used in a 4 degree bent sub drilling motor.

Universal joint assembly 300 includes a mandrel 305 fit into a cavity 340 formed by an assembly housing 310 coupled to an assembly cap 315. Multiple drive balls 335 are seated on machined pockets of the mandrel 305 within the cavity 340 and allow for omni-directional concentric rotation of the mandrel 305 within the cavity 340. The drive balls 335 may be disposed in pockets 337 of the mandrel 305 and pockets 317 of the assembly housing 310, thereby causing rotation of the assembly housing 310 upon rotation of the mandrel 305 within the cavity 340. Additionally, a floating washer 320 fits around the mandrel 305 within the cavity 340 between the assembly cap 315 and the assembly housing 310. A ring seal 325 fits within a ring seal groove 327 of the floating washer 320 and is in substantially constant contact with the mandrel 305 during rotation of the mandrel 305 within the cavity 340. A cap seal 330 fits within a cap seal groove 329 formed in the floating washer 320 and is in substantially constant contact with the assembly cap 315 during rotation of the mandrel 305 within the cavity 340.

The floating washer 320 and the seals 325 and 330 float radially within the cavity 340, thereby substantially sealing the cavity 340 from an exterior 311 of the universal joint assembly 300 during rotation of the mandrel 305 within the cavity 340 and at substantially all bent drilling angles of the universal joint assembly 300. For example, the floating washer 320 and seals 325 and 330 may be displaced radially within the cavity 340 and operate to substantially seal the cavity 340 from the exterior 311 of the universal joint assembly 300 when a longitudinal axis of the mandrel 305 is offset from a longitudinal axis of the assembly housing 310 by between approximately 0 degrees and approximately 4 degrees. In such a manner, drilling fluid flowing around and over the exterior 311 of the universal joint assembly 300 (e.g., through a central bore such as the central bore 111) is kept separate from a lubricating fluid contained in the cavity 340.

The assembly housing 310 of the universal joint assembly 300 is coupled to the assembly cap 315 through a threaded connection 393. In some aspects of the universal joint assembly 300, an o-ring 395 may be placed between the threads of the assembly housing 310 and the assembly cap 315 to ensure a fluid-tight fit. Assembly housing 310 may also include a housing connector 375 to couple the universal joint assembly 300 to another section of a downhole drilling apparatus, such as a drill bit section or bearing section.

FIGS. 3A-B also illustrate a lubricating module 345. The lubricating module 345 includes a reservoir 355 formed in the assembly housing 310. The reservoir 355 may be, in some aspects, a hollowed-out void through the assembly housing 310. A setscrew cap 350 encloses the reservoir 355 at one end. A piston 360 is inserted into the reservoir 355 at the other end and substantially encloses the other end of the reservoir 355. In some aspects, a bleed setscrew 365 may be screwed into an aperture of the piston 360. Typically, the reservoir 355 is filled or substantially filled with a lubricating substance, such as a lubricating fluid, which may travel from the reservoir 355 through a tunnel 380 to the cavity 340 in order to, for example, keep the mandrel 305, the drive balls 335, and the assembly housing 310 proximate to the cavity 340 lubricated during operation of the universal joint assembly 300.

Turning to FIG. 3A particularly, this figure illustrates the lubricating module 345 during an initial point of operation of the universal joint assembly 300. As shown in the figure, the piston 360 is at a bottom-most position within the reservoir 355 and rests on two shoulders of the assembly housing 310 that jut into the reservoir 355. Generally, the reservoir 355 is full or substantially full of lubricating fluid, at a reservoir pressure, $R_R$, 385, at the initial point of operation. Turning now to FIG. 3B, the figure illustrates the lubricating module 345 after an elapsed period of operation, in which lubricating fluid has been consumed (e.g., through heat or friction) within the cavity 340 and fluid from the reservoir 355 has been introduced into the cavity 340 through the operation of the lubricating module 345.

In some implementations, the lubricating module 345 operates as follows. During drilling operations utilizing the universal joint assembly 300, the drilling fluid is at a variable fluid pressure, $P_F$, 390. $P_F$ 390 varies according to, for example, the depth of the present drilling operation (e.g., the hydrostatic head on the column of drilling fluid in the well bore) as well as the pumping rate of the drilling fluid through the drill string and annulus. A higher $P_F$ 390 may generally indicate a deeper drilling operation, in which case the lubricating fluid within the cavity 340 has been consumed by heat and friction of the moving components of the universal joint assembly 300 due to the longer drilling time to reach deeper subterranean formations. To ensure that additional lubricating fluid enters the cavity 340 from the reservoir 355, the piston 360 is balanced between $P_R$ 385 and $P_F$ 390. As $P_F$ 390 becomes greater than $P_R$ 385, the piston 360 is forced upward into the reservoir 355, thereby forcing lubricating fluid at a substantially constant rate of flow to travel through the tunnel 380 into the cavity 340. In other words, as the drilling fluid flowing over and around the universal joint assembly 300 increases in pressure, thereby signifying deeper and/or longer drilling operations, $P_F$ 390 also increases, thereby pushing the piston 360 further into the reservoir 355 and feeding more lubricating fluid to the cavity 340. In some implementations, several o-ring seals fit within slots formed in the piston 360 and between the piston 360 and the reservoir 355 to ensure a fluid-tight seal of the piston 360 in the reservoir 355.

Figure 4:
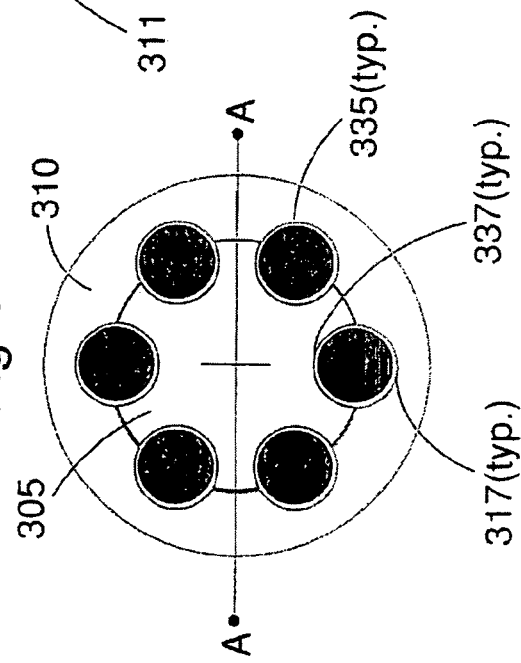
FIG. 4 illustrates a cross-sectional view of a universal joint assembly in accordance with the present disclosure.

FIG. 4 illustrates a cross-sectional view of a universal joint assembly in accordance with the present disclosure. For example, FIG. 4 may illustrate a cross-sectional view along the "A-A" line of the universal joint assembly 300 as described with reference to FIGS. 3A-B above. This view illustrates the mandrel 305 formed with multiple pockets 317 and 337. The pockets 337 and 317 (shown here as six pockets), may be machined in the mandrel 305 and assembly housing 310, respectively, and be substantially half-spherical in shape. Six substantially spherical voids are thus formed from mating pockets 317 and 337 as illustrated in FIG. 4. Alternatively, more or less pockets 317 and 337 and corresponding drive balls 335 may be used in accordance with the specific application of the universal joint assembly 300. The assembly housing 310 is fitted around the drive balls 335, where they reside in pockets 317 and 337 in the cavity 340 between the mandrel 305 and the assembly housing 310. As can be seen by FIG. 4, rotation of the mandrel 305 causes rotation of the drive balls 335 about the longitudinal centerline axis of the mandrel 305, as the drive balls 335 remain seated in their respective pockets 317 and 337. Rotation of the drive balls 335 about the centerline axis transmits torque to and causes rotation of the assembly housing 310.

Figure 5:
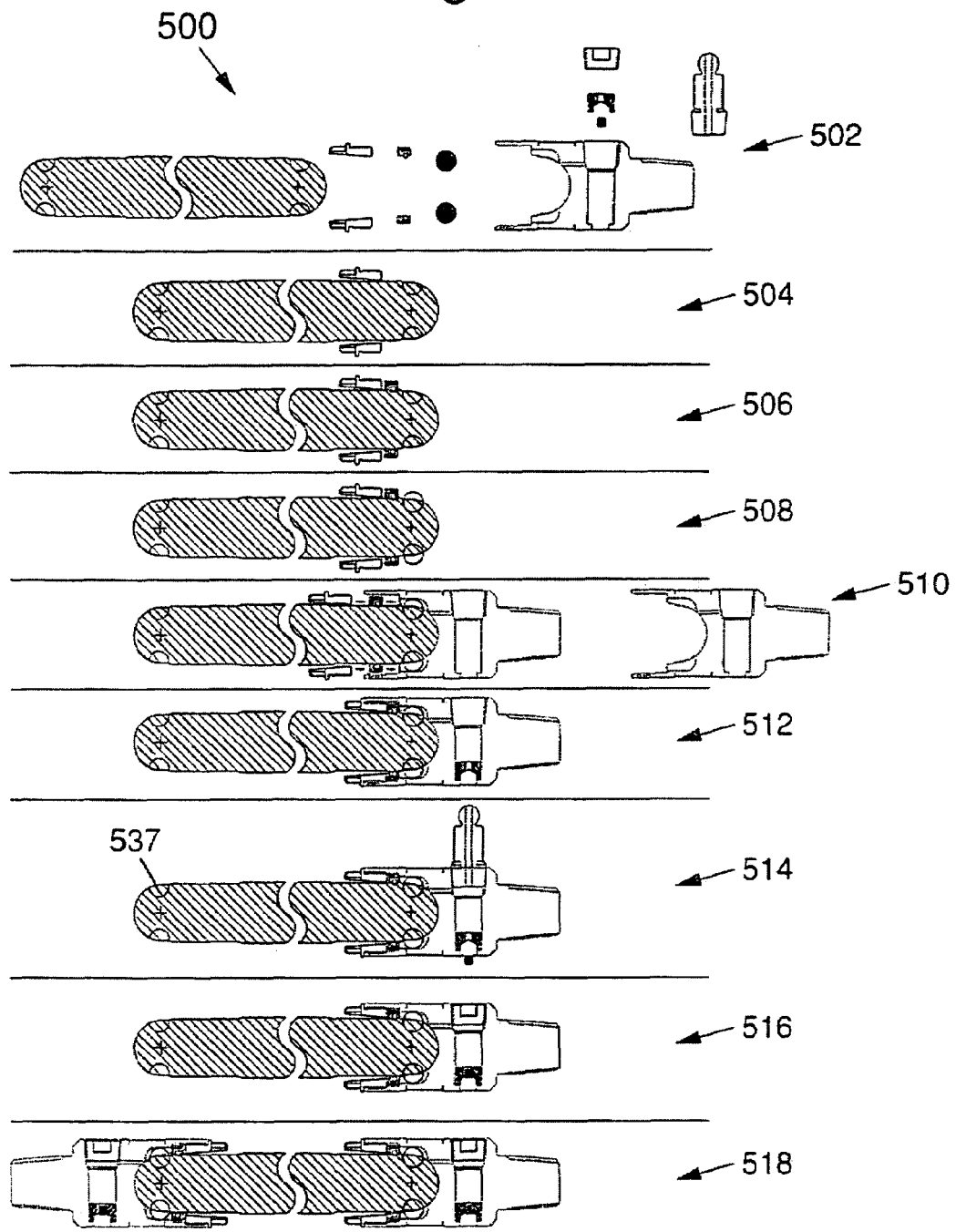
FIG. 5 illustrates one method of assembling a universal joint assembly in accordance with the present disclosure.

FIGS. 5 and 6 illustrate methods 500 and 600 of using and assembling a universal joint assembly in accordance with the present disclosure via a graphical and flowchart representation of the method. Method 500, in some aspects, may be utilized with the universal joint assembly 200 described with reference to FIGS. 2A-C or with the universal joint assembly 300 described above with reference to FIGS. 3A-B. Additionally, method 500 may be utilized with the universal joint assembly 115 described in FIG. 1. Generally, method 500 may begin by gathering the components of the universal joint assembly [502]. The components include, for example, a mandrel, an assembly cap, a washer, a ring seal, a cap seal, one or more balls, an assembly housing, and a lubricating module. The lubricating module may include a setscrew cap, a reservoir, a piston, and a bleed setscrew. These components may, in some aspects, be substantially similar to such same components described above with reference to the universal joint assembly 200 or the universal joint assembly 300. Once gathered, the assembly cap may be slid over the mandrel [504]. In some aspects, an assembler of the universal joint assembly may desire to lubricate the mandrel to allow the assembly cap to more easily slide around the mandrel.

Next, the washer may be slid over the mandrel [506]. As with the assembly cap, the assembler may desire to lubricate the mandrel, the washer, or both, to more easily facilitate the washer sliding over the mandrel. In some aspects, the ring seal may be inserted over the mandrel first before the washer. Alternatively, the ring seal and washer may be slid over the mandrel simultaneously. The assembler may then lubricate the pockets formed in the mandrel and the assembly housing. In some aspects, since the mandrel and the balls may both be formed of metallic material, lubrication may be required prior to insertion of the balls into the pockets in order to ensure no metal-to-metal contact will occur during operation of the universal joint assembly. Once the pockets are lubricated, the balls are seated into the pockets [508].

Next, the assembly housing may be slid over the mandrel, balls, and washer, thereby forming a cavity between the housing and the mandrel into which the balls reside [510]. Once the assembler has ensured that the washer is seated correctly against the assembly housing and the balls are seated correctly in the cavity, the assembly cap may be coupled to the assembly housing [512]. In some implementations, the assembly housing may include a threaded connection such that the assembly cap is screwed into the housing. Alternatively, the assembly cap and housing may be coupled by any suitable mechanical means, such as bolted or clipped together. The assembler may then insert a grease zerk into the opening of the assembly housing connected to the reservoir in order to fill the reservoir with lubricant [514]. Prior to assembling the universal joint assembly, the amount of lubricant needed relative to the drilling length or drilling operation time may be calculated. This amount may be inserted into the reservoir, ensuring that adequate lubricant is present for operation of the universal joint assembly without wasting unnecessary lubricant. Alternatively, lubricant may be inserted into the reservoir without determining how much lubricant may be needed or used during drilling operations. Prior to filling the reservoir with the lubricant, however, the assembler may insert the piston into the reservoir to enclose the lubricant. The bleed setscrew may be removed from the piston during the filling of the reservoir to make sure that any excess air contained in the reservoir prior to the addition of the lubricant is allowed to escape.

Once the reservoir has been filled with the appropriate amount of lubricant, the bleed setscrew is screwed into the piston while the cap setscrew is screwed into the assembly housing, thereby effectively enclosing the lubricant in the reservoir within the assembly housing [516]. In such fashion, assembly of one end of the universal joint assembly may be complete. Following the steps [504]-[516] above, the assembler may complete assembly of the other end of the universal joint assembly to form a completely assembled universal joint assembly [518].

FIG. 6 illustrates one method 600 of using a universal joint assembly in accordance with the present disclosure. Method 600, in some aspects, may be utilized with the universal joint assembly 200 described with reference to FIGS. 2A-C or with the universal joint assembly 300 described above with reference to FIGS. 3A-B. Additionally, method 600 may be utilized with the universal joint assembly 115 and downhole drilling apparatus 100 described in FIG. 1. Method 600 may begin by assembling the universal joint assembly [602]. The universal joint assembly may be assembled according to, for example, method 500. Alternatively, the universal joint assembly may be assembled by another appropriate method. Next, the universal joint assembly is coupled to a downhole drilling motor [604]. In some aspects, the universal joint assembly may be integral to or a part of the downhole drilling motor. Alternatively, however, the universal joint assembly may be a separate component from the downhole drilling motor in a drilling apparatus. The universal joint assembly may be coupled to, for instance, a power section of the downhole drilling motor, as illustrated in FIG. 1. In some aspects, the universal joint assembly may also be coupled to a drill bit section via a bearing section.

Once the universal joint assembly is coupled to or with the downhole drilling motor along with, for instance, the drill bit section, to form the downhole drilling apparatus, the apparatus is inserted into a well bore. For example, the universal joint assembly of method 600 may be utilized with a directional drilling apparatus in order to drill a directional (e.g., horizontal) well bore. Once a conventional downhole drilling assembly and method is used to drill a substantially vertical well bore to a specified depth, the universal joint assembly of method 600 may be utilized to kick off the directional portion of the well bore (e.g., radius) within the pre-drilled vertical well bore. Alternatively, inserting the downhole drilling apparatus into the well bore may also include starting the initial well bore drilling operations at the surface (i.e., "spudding").

Once the drilling apparatus including the universal joint assembly is inserted into the well bore, drilling fluid is supplied to the apparatus through a drill string. More specifically, the drilling fluid is supplied to the downhole drilling motor at a specified flow rate [608]. The drilling fluid may provide hydraulic power to eccentrically turn the rotor of the downhole drilling motor. This eccentric rotation may be converted into concentric rotation by the universal joint assembly and transferred to the drill bit section of the downhole drilling apparatus. In such a manner may the drill bit section rotate and thereby drill through one or more subterranean formations. As drilling fluid is continuously or semi-continuously pumped through the drill string, the downhole drilling motor, and the drill bit section to eventually return to the surface within an annulus between the drill string and well bore, the well bore may be drilled to a specified depth of a production zone, e.g., a geologic formation containing a petroleum natural resource [610].

A number of implementations have been described. Nevertheless, it will be understood that various modifications may be made. For example, methods 500 and 600 may include more or fewer steps without departing from the present disclosure. Further, the illustrated steps of methods 500 and 600 may be performed in substantially the same order presented or in various other orders, as appropriate. Accordingly, other implementations are within the scope of the following claims.

What is claimed is:

1. A universal joint assembly comprising:
    an assembly housing having a plurality of pockets formed in an interior surface of the assembly housing, the pockets configured to partially receive a plurality of drive balls;
    an assembly cap coupled to the assembly housing;
    a rotatable mandrel fitted within a cavity defined by the assembly housing and the assembly cap, the mandrel having a plurality of pockets configured to partially receive the drive balls
    the plurality of substantially spherical drive balls rotatable within the cavity about a central axis of the mandrel;
    a substantially circular groove formed in the cavity, the groove defined by a proximal end of the assembly cap and an interior wall and a shoulder of the assembly housing; and
    a floating washer disposed within the substantially circular groove and configured to radially displace within the groove when the central axis of the mandrel is displaced from a central axis of the assembly housing, the floating washer having an inner radial surface in sealing contact with the mandrel thereby retaining a lubricating fluid within the cavity.

2. The universal joint assembly of claim 1 further comprising a ring seal disposed in a ring seal groove formed in the inner radial surface of the floating washer, the ring seal disposed between the floating washer and the mandrel and in sealing contact with the mandrel and the washer during rotation of the mandrel within the cavity.

3. The universal joint assembly of claim 1 further comprising:
    a reservoir formed in the assembly housing and configured to store the lubricating fluid, the reservoir in fluid communication with the cavity; and
    a lubricant piston comprising:
        an interior surface, a first pressure applied to the interior surface; and
        an exterior surface, a second pressure applied to the exterior surface, the lubricant piston configured to drive the lubricating fluid from the reservoir to the cavity when the second pressure is greater than the first pressure.

4. The universal joint assembly of claim 3, wherein the second pressure is substantially equal to a pressure of a drilling fluid between the assembly housing and a drill string.

5. The universal joint assembly of claim 3, wherein the reservoir is configured to enclose a predetermined amount of lubricating fluid calculated based on a length of drilled well bore.

6. The universal joint assembly of claim 1, wherein the assembly housing comprises a threaded connection.

7. The universal joint assembly of claim 1 further comprising a cap seal disposed in a cap seal groove formed in the floating washer, the cap seal disposed between the washer and the assembly cap and in contact with the assembly cap and the washer during rotation of the mandrel within the cavity.

8. The universal joint assembly of claim 7 further comprising an o-ring seal disposed between the assembly cap and the assembly housing.

9. The universal joint assembly of claim 1, wherein the floating washer is configured to radially displace within the groove when the central axis of the mandrel is displaced from the central axis of the assembly housing by between approximately 0 degrees and approximately 4 degrees.

10. A downhole drilling apparatus comprising:
    a downhole drilling motor; and
    a universal joint assembly coupled to the downhole drilling motor comprising:
        an assembly housing having a plurality of pockets formed in an interior surface of the assembly housing, the pockets configured to partially receive a plurality of drive balls;
        an assembly cap coupled to the assembly housing;
        a rotatable mandrel fitted within a cavity defined by the assembly housing and the assembly cap, the mandrel having a plurality of pockets configured to partially receive the drive balls
        the plurality of substantially spherical drive balls rotatable within the cavity about a central axis of the mandrel;

a substantially circular groove formed in the cavity, the groove defined by a proximal end of the assembly cap and an interior wall and a shoulder of the assembly housing; and a floating washer disposed within the substantially circular groove and configured to radially displace within the groove when the central axis of the mandrel is displaced from a central axis of the assembly housing, the floating washer having an inner radial surface in sealing contact with the mandrel thereby retaining a lubricating fluid within the cavity.

11. The downhole drilling apparatus of claim 10 further comprising a ring seal disposed in a ring seal groove formed in the inner radial surface of the floating washer, the ring seal disposed between the floating washer and the mandrel and in sealing contact with the mandrel and the washer during rotation of the mandrel within the cavity.

12. The downhole drilling apparatus of claim 10, wherein the universal joint assembly further comprises:

a reservoir formed in the assembly housing and configured to store the lubricating fluid, the reservoir in fluid communication with the cavity; and a lubricant piston comprising:
an interior surface, a first pressure applied to the interior surface; and
an exterior surface, a second pressure applied to the exterior surface, the lubricant piston configured to drive the lubricating fluid from the reservoir to the cavity when the second pressure is greater than the first pressure.

13. The downhole drilling apparatus of claim 12, wherein the second pressure is substantially equal to a pressure of a drilling fluid flowing through the downhole drilling motor.

14. The downhole drilling apparatus of claim 10, wherein the assembly housing is coupled to the downhole drilling motor via a threaded connection.

15. The downhole drilling apparatus of claim 10, wherein the downhole drilling motor comprises a moineau-style drilling motor.

16. The downhole drilling apparatus of claim 10, wherein the universal joint assembly further comprises a cap seal disposed in a cap seal groove formed in the floating washer, the cap seal disposed between the washer and the assembly cap and in contact with the assembly cap and the washer during rotation of the mandrel within the cavity.

17. The downhole drilling apparatus of claim 16 further comprising an o-ring seal disposed between the assembly cap and the assembly housing.

18. The downhole drilling apparatus of claim 10, wherein the floating washer is configured to radially displace within the groove when the central axis of the mandrel is displaced from the central axis of the assembly housing by between approximately 0 degrees and approximately 4 degrees.

19. A method of using a downhole drilling apparatus, the downhole drilling apparatus comprising:

providing a downhole drilling motor;

providing a universal joint assembly, the universal joint assembly comprising:
an assembly housing having a plurality of pockets formed in an interior surface of the assembly housing, the pockets configured to partially receive a plurality of drive balls;
an assembly cap coupled to the assembly housing;
a rotatable mandrel fitted within a cavity defined by the assembly housing and the assembly cap, the mandrel having a plurality of pockets configured to partially receive the drive balls
the plurality of substantially spherical drive balls rotatable within the cavity about a central axis of the mandrel;
a substantially circular groove formed in the cavity, the groove defined by a proximal end of the assembly cap and an interior wall and a shoulder of the assembly housing; and
a floating washer disposed within the substantially circular groove and configured to radially displace within the groove when the central axis of the mandrel is displaced from a central axis of the assembly housing, the floating washer having an inner radial surface in sealing contact with the mandrel and thereby retaining a lubricating fluid within the cavity;

coupling the universal joint assembly to the downhole drilling motor;

inserting at least a portion of the downhole drilling apparatus into a well bore; and supplying power to the downhole drilling motor.

20. The method of claim 19, wherein supplying power to the downhole drilling motor comprises supplying a drilling fluid at a specified flow rate to the downhole drilling motor.

21. The method of claim 19, wherein prior to coupling the universal joint assembly to the downhole drilling motor, the method further comprises the steps of:

sliding the assembly cap over the mandrel;

sliding the washer over the mandrel;

seating the plurality of substantially spherical drive balls on the mandrel; and coupling the assembly housing to the assembly cap over the mandrel.

22. The method of claim 21, wherein seating the plurality of substantially spherical drive balls on the mandrel comprises:

machining the plurality of pockets on the mandrel, the plurality of pockets equal to the plurality of substantially spherical drive balls; and seating the plurality of substantially spherical drive in the plurality of pockets machined on the mandrel.

\* \* \* \* \*